(12) United States Patent
Rosero et al.

(10) Patent No.: US 11,639,881 B1
(45) Date of Patent: May 2, 2023

(54) INTEGRATED, CONTINUOUS DIAGNOSIS, AND FAULT DETECTION OF HYDRODYNAMIC BEARINGS BY CAPACITANCE SENSING

(71) Applicants: Carlos A. Rosero, Bogota (CO); Nannaji Saka, Cambridge, MA (US)

(72) Inventors: Carlos A. Rosero, Bogota (CO); Nannaji Saka, Cambridge, MA (US)

( * ) Notice: Subject to any disclaimer, the term of this patent is extended or adjusted under 35 U.S.C. 154(b) by 212 days.

(21) Appl. No.: 17/145,900

(22) Filed: Jan. 11, 2021

Related U.S. Application Data

(63) Continuation-in-part of application No. 16/424,007, filed on May 28, 2019, now abandoned, which is a continuation of application No. 14/547,215, filed on Nov. 19, 2014, now abandoned.

(51) Int. Cl.
*G01M 13/04* (2019.01)

(52) U.S. Cl.
CPC .................................. *G01M 13/04* (2013.01)

(58) Field of Classification Search
CPC .................................................... G01M 13/03
See application file for complete search history.

(56) References Cited

U.S. PATENT DOCUMENTS

| | | |
|---|---|---|
| 4,380,172 A | 4/1983 | Imam et al. |
| 4,520,694 A | 6/1985 | Eschrich et al. |
| 4,590,804 A | 5/1986 | Brull |
| 4,687,274 A | 8/1987 | Suh et al. |
| 4,975,855 A | 12/1990 | Miller et al. |
| 5,070,832 A | 12/1991 | Hapka et al. |
| 5,159,563 A | 10/1992 | Miller et al. |
| 5,287,735 A | 2/1994 | Klauber et al. |
| 5,381,692 A | 1/1995 | Winslow et al. |
| 5,390,545 A | 2/1995 | Doan |
| 5,509,460 A | 4/1996 | Chun et al. |
| 5,613,586 A | 3/1997 | Schilling et al. |
| 5,673,746 A | 10/1997 | Chun et al. |
| 5,675,094 A | 10/1997 | Klauber et al. |
| 5,686,672 A | 11/1997 | Klauber et al. |
| 5,869,752 A | 2/1999 | Klauber et al. |
| 5,949,676 A | 9/1999 | Elsley |
| 6,197,178 B1 | 3/2001 | Patel et al. |
| 6,370,957 B1 | 4/2002 | Filippenko et al. |
| 6,449,564 B1 | 9/2002 | Kliman et al. |
| 6,458,013 B1 | 10/2002 | Saka et al. |
| 6,476,921 B1 | 11/2002 | Saka et al. |
| 6,687,654 B2 | 2/2004 | Smith, Jr. et al. |

(Continued)

FOREIGN PATENT DOCUMENTS

| | | |
|---|---|---|
| EP | 1018640 | 5/2008 |
| WO | WO2006007058 | 1/2006 |

*Primary Examiner* — David Z Huang
*Assistant Examiner* — Jean F Morello
(74) *Attorney, Agent, or Firm* — Malloy & Malloy, P.L.

(57) ABSTRACT

A hydrodynamic bearing fault prediction, detection, diagnosis, and response system for combustion ignition engines, machines and/or coupled components of a combustion ignition engine and/or machine; a plurality of transducers, each disposed proximally or about each of the engine/machine components or engine itself; with at least one transducer with capacitance sensing abilities, each of the transducers disposed to react to changes in the dielectric constant of a nanosuspension circulated about the monitored component.

27 Claims, 5 Drawing Sheets

(56) References Cited

U.S. PATENT DOCUMENTS

| | | |
|---|---|---|
| 6,756,908 B2 | 6/2004 | Gass et al. |
| 6,763,312 B1 | 7/2004 | Judd |
| 6,795,779 B2 | 9/2004 | Delvaux et al. |
| 6,798,529 B2 | 9/2004 | Saka et al. |
| 6,813,581 B1 | 11/2004 | Snyder |
| 6,880,784 B1 | 4/2005 | Wilkinson et al. |
| 6,889,553 B2 | 5/2005 | Robinson et al. |
| 7,006,953 B2 | 2/2006 | Takemura et al. |
| 7,040,295 B2 | 5/2006 | Karem |
| 7,103,507 B2 | 9/2006 | Gorinevsky et al. |
| 7,124,637 B2 | 10/2006 | Singhal et al. |
| 7,222,002 B2 | 5/2007 | Maine |
| 7,222,027 B2 | 5/2007 | Gorinevsky et al. |
| 7,343,265 B2 | 3/2008 | Andarawis et al. |
| 7,366,627 B2 | 4/2008 | Gordon et al. |
| 7,379,845 B2 | 5/2008 | Gorinevsky et al. |
| 7,413,919 B2 | 8/2008 | Qing et al. |
| 7,457,785 B1 | 11/2008 | Greitzer et al. |
| 7,458,266 B2 | 12/2008 | Beard et al. |
| 8,758,091 B2 | 6/2014 | Saka et al. |
| 9,429,092 B2 | 8/2016 | Rosero |
| 9,733,230 B2 * | 8/2017 | Von Herzen ........... G01N 21/95 |
| 2002/0138217 A1 | 9/2002 | Shen et al. |
| 2004/0149084 A1 | 8/2004 | Chun et al. |
| 2005/0096873 A1 | 5/2005 | Klein |
| 2005/0246150 A1 | 11/2005 | Shiromaru et al. |
| 2006/0122809 A1 | 6/2006 | Clarke et al. |
| 2007/0027593 A1 | 2/2007 | Shah et al. |
| 2008/0284575 A1 | 11/2008 | Breed |
| 2009/0322373 A1 | 12/2009 | Dooley |
| 2010/0281843 A1 | 11/2010 | Smith |
| 2010/0292937 A1 | 11/2010 | Hosny et al. |
| 2011/0202800 A1 | 8/2011 | Mackey et al. |
| 2011/0224917 A1 | 9/2011 | Uluyol et al. |
| 2012/0022762 A1 | 1/2012 | Rosero |
| 2013/0304351 A1 | 11/2013 | Gillette, II |
| 2014/0336869 A1 | 11/2014 | Bou-Ghannam et al. |
| 2015/0369697 A1 | 12/2015 | Hamilton et al. |
| 2016/0005244 A1 | 1/2016 | Bell et al. |

* cited by examiner

US 11,639,881 B1

INTEGRATED, CONTINUOUS DIAGNOSIS, AND FAULT DETECTION OF HYDRODYNAMIC BEARINGS BY CAPACITANCE SENSING

CLAIM OF PRIORITY

The present application is a continuation-in-part application of U.S. patent application Ser. No. 16/424,007, filed on May 28, 2019, which is a continuation patent application of U.S. patent application Ser. No. 14/547,215, filed on Nov. 19, 2014, and which is incorporated herein by reference.

FIELD OF THE INVENTION

The present invention is directed to systems and methods of predicting, detecting, diagnosing, and responding to faults of engines and/or machinery and/or components thereof, and particularly, faults occurring in bearings thereof. More specifically, the present invention employs systems which monitor changes in the dielectric constant of a nanosuspension which is circulated about the engine, machinery, etc.

DESCRIPTION OF THE RELATED ART

Currently, there exist in the art systems and methods of detecting faults within components of complex machinery. Particularly, at least one known method provides for the monitoring of components via application of sensors configured to monitor vibration and/or periodic displacement of a component to assess the likelihood of stress fractures propagating in the component. Generally, it is known that a relatively stiff component will have a higher natural vibration frequency than a less stiff component, and that stress fractures can reduce the stiffness of a component. Thus, as the component develops stress fractures from use it will begin to vibrate at increasingly lower frequencies. Accordingly, a critical fault can be diagnosed upon the component reaching a predetermined natural vibration frequency that is characteristic of a high level of stress fractures in the component.

Given that many engines and/or machinery operate in cyclical fashion, many engines and/or machines also include bearings such as plain bearings and/or journal bearings, such as those generally disposed about axles of engines and/or machines which may be of a two- or three-piece configuration, as well as ball bearings and other types of bearings. Such axles may include, for example, a crankshaft of the engine/machine or camshaft of the engine/machine. The failure mechanics of a bearing tends to be caused by contact stress such as those modeled by Hertzian contact theory, or even adhesive contact stress. Additionally, contaminants in the lubricating medium, generally produce bearing wear, such as solid flakes or other particles, including magnetic particles, can lead to failure as well. As such, the principal failures tend to occur as geometrical deformation such as extrusion, flaking, and wearing. Therefore, simple vibration analysis alone is insufficient to accurately predict bearing failures.

Hydrodynamic bearing failures are among the leading causes of catastrophic failure of machines that use them. Such machines include, for example, internal combustion engines, electric motors and generators, hydraulic machinery, gas and diesel turbines, wind and hydraulic turbines, and so on. Those failures result in high cost to the industry as repair, downtime, and even the interruption of some critical missions. Depending on the application, such interruptions can create a risk also to human beings and expensive equipment.

In accordance with this, the present invention provides significant improvements in the field of failure prediction of bearing surfaces.

SUMMARY OF THE INVENTION

To these ends, the system includes, in at least one embodiment, the introduction of nanoparticles into the base lubricant or oil used in a machine in order to create a nanosuspension. The nanoparticles are selected to have a significantly higher dielectric constant than that of the base oil, and therefore significantly affect the dielectric constant (or relative permittivity) of the nanosuspension. When geometric variations occur in bearing surfaces, it is typically due to cracks, flakes, fractures, extrusion, or some other failure creating a void in the surface of the bearing. The nanoparticles in suspension will tend to congregate within these voids, and therefore the concentration of nanoparticles in other areas will decrease. This will lead to a decrease in the relative permittivity or dielectric constant of the lubricant containing the nanosuspension. Therefore, the present invention utilizes such a technique to diagnose and predict failures.

Before continuing on with further discussion of the operative features of the invention, it should be noted that the principles of operation of the present invention can be deployed in a variety of machinery such as combustion ignition engines, components of combustion ignition engines, bearings operative in such combustion ignition engines, machinery, components of machinery, and bearings operative in such machinery. Such machinery may include hydrodynamic bearings, rotating hydrodynamic bearings, translating hydrodynamic bearings, turbines, pumps, generators, motors (electric included), compressors, rotating compressors, translating compressors, aviation equipment, and/or defense equipment.

One object of the present invention is to provide an intelligent system that will detect, diagnose, and manage, automatically, machines facing failure, simultaneously or sequentially. The system detects, in real-time, the failure initiation in a hydrodynamic bearing by dispersing high dielectric constant nanoparticles that act as dielectric-constant enhancers. The nanoparticles could be added to any base lubricant. If the concentration of the nanoparticles in the circulating lubricant falls, it may be inferred that nanoparticles have been trapped in the bearing walls that have pits, scratches, and other surface defects. Thus, a fall in dielectric constant is an indication of the presence of pits and scratches, which, in turn, indicates impending failure. Therefore, a capacitance sensor has been developed to detect the failure initiation and growth.

The system is automatic, and has a machine learning-based algorithm that allows it to learn from the information obtained over time, thus improving its accuracy with time. Being an automatic system, it acts on its own, without human intervention, and alerts impending failures and protects expensive equipment. However, if the situation requires so, there is a feature that allows the operator to take the command. More specifically, the present invention includes requisite structuring and facilities to detect, diagnose, and importantly, predict bearing failures. Additionally the present invention includes systems operative to intelligently respond to data collected by the system in order to avoid bearing failures and/or prolong and predict the time period between bearing failures. As such, the present invention will result in significant cost reduction to industry including end users, by reducing or avoiding expensive, catastrophic bearing failures, and the additional damage to other engine/machinery components that inevitably results. Additionally, factories may take advantage of the present invention as a tool to be used in equipment design and warranty cost reduction, as multiple iterations of component design may be tested without actually running to failure, and instead, the present invention may be used to predict component life. An additional benefit of the present invention is that it comprises an intelligent, self-sufficient system such that minimal human interaction is ever required, and in some uses, no human interaction may be required at all. The system is structured and configured to collect data, predict and/or diagnose faults, as well as take action to avoid and/or prolong a fault, automatically. Accordingly, operating costs may be reduced, as staffing and maintenance of engines/machines can be reduced.

An additional feature of the present invention is the capability to produce tailored reports comprising primary input signals, secondary input signals, engine/machine condition data, failure predictions, wear trends, variation trends and the like. Such tailored reports can be transmitted directly to an engine/machine operator, for example, over a cellular or other wireless network. Additionally, such tailored reports may be released to manufacturers of the combustion ignition engines and/or manufacturers of machines to more precisely analyze the failure mechanics and other metrics of the specific components. Further, such tailored reports may be sent to automated and/or unmanned systems for further computational analysis.

As a point of clarification, the term "particle" or "particles" is used to refer to undesired matter introduced into the oil when a failure point forms (such as a flake in the surface of the bearing). On the other hand, the term "nanoparticle" or "nanoparticles" is used to refer to the particular matter that is selected and deliberately introduced into the base lubricant in order to form the nanosuspension utilized by the present invention. The concentration of both "particles" and "nanoparticles" may be monitored according to various embodiments of the invention.

Turning to the principles of operation of the present invention, the system receives two types of information: one directly from sensors as primary input signals. The other, called secondary input signals, which are calculated from data uploaded from, for example, oil analysis.

In at least one embodiment, a plurality of transducers are placed on various components of the engine and/or machine to be monitored. Such monitored components can be distinguished from other, operative components, in the engine and/or machine. The transducers used can be any of a variety of sensors configured to convert a predetermined physical quantity into an electrical signal. By way of non-limiting example using an engine, the transducers may be disposed on a crankshaft, camshaft, or axle, in order to detect the eccentricity of rotation thereof and/or the transducer(s) may be placed at various points along an engine's main oil lines in order to sense a capacitance and/or further, a dielectric contrast variation of a suspension, the suspension being oil with dielectric nanoparticles infused therein. A suspension, for purposes of this present invention may be defined as an oil with dielectric nanoparticles infused therein. In another example, the transducer may be capacitive transducer to convert a sensed physical quantity such as capacitance into an electrical signal for further processing. Again, the present invention may comprise many sensors/transducers, and not be limited to just one. In another embodiment, the capacitive transducer may be disposed on or in an engine, engine component, machine, machine component and/or bearing which utilizes at least one fluid to operate.

A feature of the present invention, and utilizing the non-limiting example above, additional transducers may be disposed to detect particulate matter in oil, magnetic metals detection, bearing deformation, bearing thickness, bearing length, bearing protrusion from housing, axle concentricity variation, soot concentration in oil, fuel dilution in oil, fuel temperature, fuel specification, fuel content, fuel water content, turbocharger pressure, capacitance, crankshaft vibration signature variation, and/or measurable characteristics of a suspension. Furthermore, the present invention may be configured to take advantage of transducers that may be preinstalled or included as original equipment manufacturer ("OEM"), such as, oil viscosity, oil temperature, engine/machine power delivery, throttle position, engine/machine speed (RPM or other period of operation), exhaust temperature, operating altitude, and ambient temperature, for example. Furthermore, transducers may be disposed on an end of a crankshaft, camshaft, or axle, on a connecting rod couple, on each of a plurality of crankshaft counterweights, as well as in proximity to each of a plurality of bearings disposed about a crankshaft, camshaft, or axle.

The system of the present invention includes a signal processing module in communication with each of a plurality of transducers as largely described above. The signal processing system is structured and configured to receive as input, both primary input signals and/or secondary input signals, or structured and configured as will be discussed below. The transducers generate the primary input signals by converting physical quantities into electrical signals, for example a variation in speed may be converted into a variation in voltage. By way of another example, a capacitance may be converted into a relative permittivity. A relative permittivity may also be commonly known as a dielectric constant. Primary input signals may comprise any of the following: capacitance, relative permittivity, a dielectric constant of a material, bearing geometry variation, such as diameter, width, and thickness, detected with reference to proximity sensors disposed proximal to each of a plurality of bearings; failure initiation, such as cracks, flakes, deformation, and extrusion, the growth rate and shape/pattern of which are detected by a variety of appropriate transducers; engine/machine life in hours, or fractions thereof; oil/suspension condition, such as pressure, temperature, particulate matter concentration, especially magnetic particles, fuel dilution, as well as soot concentration; engine/machine operation characteristics, such as fuel condition, engine speed, coolant temperature, exhaust temperature, air intake temperature, turbocharger boost pressure; fuel condition, such as viscosity, water content, and catalytic fines content; ambient conditions, such as altitude, ambient temperature, and atmospheric pressure; capacitance of operating fluids; capacitance of areas in which operating fluids are present; and, vibration signature change of major engine/machine components, such as crankshafts, dampers, and or camshafts.

In at least one other embodiment the transducers utilized in the present invention may be categorized with respect to the type of physical quantity measured. For example geometrical transducers may include those disposed, structured, and/or configured to perform particle/flake detection, magnetic metals detection, bearing deformation measurement, bearing thickness measurement, bearing length measurement, bearing protrusion from housing measurement, and axle concentricity variation measurement. By way of another example oil/suspension transducers may include those disposed, structured, and configured to measure soot concentration, fuel dilution, viscosity, oil temperature, capacitance, capacitance of a suspension of oil formed by oil mixed with nanoparticles, and oil pressure. Further, an example of a transducer may be a capacitive transducer, disposed, structured, and configured to measure relative permittivity of a fluid or volume in which a fluid may be present. By way of yet another example fuel transducers may include those disposed, structured, and configured to measure fuel temperature, water content, relative permittivity, and catalytic fines content. By way of further example, engine/machine performance transducers may include those disposed, structured, and configured to measure power delivery, throttle position, engine/machine operational speed characteristics, blow-by, exhaust temperature, boost pressure in a turbocharger/machine, and crankshaft vibration signature variation. By way of yet further example site condition transducers may include those disposed, configured, and structured to measure altitude and ambient temperature. Generally, modern engines/machines are equipped with a suite of transducers capable of detecting or measuring at least some of the above-mentioned physical quantities. Accordingly, the present invention may be configured to take advantage of the various transducers included in an engine/machine, and to supplement with additional transducers as necessary. In such a case as a plurality of engines/machines are deployed in parallel, such as in power generation or fracturing applications, additional physical quantity may comprise a measure of load sharing derived from a load sharing module or fracturing engine control module and/or comparable machine control module.

Secondary input signals can comprise: oil life, including oil temperature and pressure changes, oil added, oil history, such as metal trends and fuel dilution, oil analysis reports, oil change intervals, fuel analysis reports, fuel specification variation, relative permittivity of specified fluids, relative permittivity of volumes in which specified fluids are present, ending condition, such as current functioning parameters, like engine/machine maintenance history, as well as the power delivery profile or duty cycle of a machine. Additionally, the present invention can incorporate various wear trends as secondary input signal. At least one wear trend can comprise a first wear trend, in which a given bearing's wear pattern, or geometric deviation, is compared to the same bearing's initial dimensions. In another embodiment, a first wear trend may be defined as a predetermined calibration, such a specific quantifiable quantity. By way of non-limiting example such a specific quantifiable quantity may be a predetermined, calibrated relative permittivity of a fluid. Further, a first wear trend may be defined as a relative permittivity of a fluid within and/or in contact with an engine/machine, bearing and/or engine/machine component compared to an initial relativity of such a fluid. In one embodiment, such a fluid may be known as a suspension. Another wear trend can comprise a second wear trend, in which a given bearing's wear pattern is compared to at least one other wear pattern of a given bearing in the same set, such as a plurality of bearings disposed about a crankshaft. In another embodiment, the second wear trend may comprise a relative permittivity of a fluid within and/or in contact with an engine/machine, bearing and/or engine/machine component. Again, such a fluid may be known as a suspension. Further, a second wear trend may be defined as a relative permittivity of a fluid operatively disposed in relation to a first one of a plurality of bearings and/or engine/machine components compared to a relative permittivity of a fluid operatively disposed in relation to at least a second one of the plurality of bearings and/or engine/machine components located within and/or on an engine/machine. In other embodiments, the second wear trend may comprise a given bearing's wear pattern and/or fluid operatively disposed in relation to a given bearing compared to all of the bearings within the set. By way of example a set of bearings may comprise all of the bearings disposed about a crankshaft or camshaft. In the above examples, by way of non-limiting example, the fluid which may be used to have a relative permittivity defined thereon may be a suspension, as previously described.

As previously mentioned the present invention is capable of detecting, diagnosing, and predicting, failures as well as taking action to prevent failures which occur in engines/machines using bearings. To this end, the present invention utilizes a variety of transducers to measure, in real time, various physical quantities associated with various engine/machine components, including but not limited to the bearings themselves, but also other components which may exhibit behavior that is symptomatic of bearing failure, such as uncharacteristic vibrations in dynamic components, uncharacteristic changes in relative permittivity of fluids or specific volumes in which fluids are present, particles in oil such as those originating from a bearing undergoing a failure process, oil pressure drop, a temperature increase of a part or its surroundings, or increased likelihood of bearing failure such as the presence of fuel, soot, or chemical contaminants like sulfur, etc. The present invention also compares those physical quantities static reference points, such as an initial physical quantity value stored in a memory of the system, or dynamic references, such as variation trends such as the wear trends described above, both references may be referred to as a secondary input signal.

The processing of the primary input signal and secondary input signal is conducted within a control module of the system, which may include at least a signal processing system as well as a memory. In some embodiments the signal processing system comprises a high-speed control module. In other embodiments of the system the signal processing system comprises an engine control module ("ECM"), which is sometimes referred to in the industry as a Power Control Module ("PCM"). In an embodiment wherein the system is placed on a machine that is not an engine, the signal processing system comprises a comparable system to an engine control module. The signal processing system is preset with an algorithm to process the various primary input signals and secondary input signals as inputs, or conversely, to calculate one, given another. In other words, a primary input signal may be converted into a secondary input signal via the signal processing system, in order to create the variation trends such as wear trends and also to make predictions of failures based on at least the wear trends. The signal processing system is also configured to compare the primary input signal to the secondary input signal, and according to a predetermined operative logic, can take a corresponding action based at least on the magnitude of the variation between the primary input signal and the secondary input signal. By way of example, if the primary input signal indicates a slight increase in the relative permittivity of a suspension, and/or change in the capacitance of operating fluids then the system may: (1) record the primary input signal (increase in particle concentration and/or relative permittivity of operating fluids) to the memory as secondary input signal; (2) incorporate the new secondary input signal into the variation trends according to a predetermined algorithm; (3) authorize the engine/machine to continue working for a period of time determined with reference to the variation trends; and/or (4) adjust a maintenance interval of the engine/machine, such as decrease the time period until the next oil change.

By way of yet another example, if the primary input signal, when compared to the secondary input signal, indicates a sudden and drastic increase in a characteristic length of the bearing and/or a sudden and/or drastic increase or decrease in a characteristic relative permittivity of a fluid operatively disposed in relation to at least one bearing and/or engine/machine component, then that may indicate a failure of the bearing by extrusion and/or a failure of at least one bearing and/or engine/machine component by deterioration, pitting, scratching, grooves or other forms of material loss. Accordingly, the system may: (1) shut-down the engine/machine; (2) record the primary input signal (increase in length and/or increase or decrease in relative permittivity of a fluid) to the memory as secondary input signal; (3) incorporate the new secondary input signal into the variation trends according to a preset algorithm; (4) output the primary input signal and secondary input signal as a report; (5) store the report in a memory of the system; and/or (6) transmit the report via a wireless network to a pre-established computer device.

Additionally, the present invention is capable of holistic assessments of the engine/machine, rather than merely processing and comparing primary input signal from a single transducer at a time. By way of example, the operative logic of the system is capable of monitoring at least the oil pressure and oil temperature, partially because oil temperature and oil pressure affect oil's ability to properly lubricate components. By way of further example, a minor decrease in oil pressure or a minor increase in oil temperature may cause the system to signal an alarm to an operator of the engine/machine, if the engine is working on partial load like 75%. However, should a minor decrease in oil pressure occur concurrently to a minor increase in oil temperature, but the engine is working at full load, then the system may take action to reduce power by steps, go to idle or to shut down the engine.

By way of further example of the holistic assessment capabilities, and as disclosed above, the present invention may provide for the disposition of a variety of transducers on and/or about various other engine/machine components that may exhibit behaviors symptomatic of failure. For example, a crankshaft about which bearings are mounted may present increasingly larger or otherwise uncharacteristic vibrations as bearings begin to wear and thus the crankshaft loses concentricity. To this end, it may be desirable to dispose transducers on one or more ends of the crankshaft to measure any amount of eccentricity exhibit during the crankshaft's rotation. Such a transducer may be of the type generally referred to as an accelerometer.

Additionally, as bearings begin to wear, metal-to-metal contact can increase within a bearing and thus frictional forces are increased. As frictional forces increase the amount of heat produced by the metal-to-metal contact will also increase and be exhibited by an increase in bearing oil temperature, oil temperature, and coolant temperature as well. Thus it may be desirable to dispose transducers within the crankcase, to monitor the temperature thereof or contents associated therewith. Such a transducer may be of the type generally referred to as a thermocouple or thermistor.

In order for the present invention to function as intended, a user may have the option to alter, select, monitor and/or specify the characteristics of the operating fluids of an engine, engine component, engine bearing, machine, machine component, and/or machine bearing associated with the present invention. By way of non-limiting examples, a user may wish to alter engine/machine fluids, such as oil, to infuse high dielectric constant nanoparticles into the fluid. The infusion of dielectric nanoparticles may also be infused to fluids such as, but not limited to hydraulic fluids, transmission fluids, brake fluids, or otherwise fluids to be used in contact with engines/machines and/or engine/machine components. Oil infused with dielectric nanoparticles may be described or otherwise referred to as a suspension or a nanosuspension.

In the above example wherein a user may have altered engine/machine oil, a user may specify a predetermined amount of dielectric nanoparticles to be infused into the oil, forming a nanosuspension. This specification of a predetermined amount of dielectric nanoparticles to be infused into the oil may be to alter the relative permittivity of the oil infused with the dielectric nanoparticles. In a preferred embodiment, the nanosuspension concentration may be on the order of 1%-2% nanoparticles by volume. In yet another preferred embodiment, the nanoparticles are of a material having a dielectric constant at least one hundred times greater than that of the base lubricant. Furthering the example, as the engine/machine operates, naturally, a loss of material occurs in the engine/machine, such as pitting, grooving, scratching, cracking and/or flaking. The nanoparticles suspended in the base lubricant will naturally become trapped in these voids, and more nanoparticles will become trapped as the void grows. Accordingly, as nanoparticles are removed from the nanosuspension (via their concentration in discrete voids) the overall dielectric constant of the nanosuspension (as measured in other areas) will decrease.

For purposes of the present invention, the decrease in dielectric constant of the nanosuspension is an indication of a failure mode involving geometric variation. Therefore, one or more capacitance sensors may be utilized to detect the capacitance of the nanosuspension. As such, the capacitance (in this form would be classified as a primary input signal) could then be converted into a secondary input signal (such as a relative permittivity) of an area, which may be expressed or known as the relative permittivity of a fluid (the fluid being the oil infused with dielectric nanoparticles). Such a secondary input signal could then be used as intended by the present invention in order for the present invention to function per one of the invention's multiple embodiments, or in conjunction with one of the invention's multiple embodiments. Furthermore, the rate at which the dielectric constant of the nanosuspension decreases is related to the speed of growth of the void. Therefore, the rate of change in capacitance detected by capacitance sensors is related to the rate at which an oncoming failure is approaching the system.

The system may also include a plurality of proximity sensors disposed to detect geometric variations in the monitored components, such as bearings. By combining the data collected by the capacitance sensors with data collected by each of a plurality of proximity sensors, the system is able to determine not just that a failure has begun propagating, or the speed of growth of the failure, but also the location of the failure, even as to a particular component or bearing. This is accomplished by continually monitoring the geometric variations of a bearing and comparing those against an initial baseline (e.g. a first wear trend) as well as the geometric variation of every other bearing in the set (e.g., a second wear trend).

The control system is also capable of generating an output signal based on, at least in part, the processing of the primary input signal, which comprises a reactive component of the present invention. The output signal is capable of carrying out various actions with respect to the various components of the engine/machine. By way of example the output signal may be operative to activate an audible or visual alarm; reduce power produced by the engine/machine; deactivate selected fuel injectors of the engine/machine; maintain the engine at a predetermined speed (RPM); deactivate the engine/machine; transmit a signal indicating that the engine requires service; and authorize the engine to continue working for a predetermined time period despite having a detected failure. Furthermore the output signal may be operative to carry out reporting functions as well, such as, transmit a report via wireless network; write data to the memory or ECM, or comparable machine system; and, in the case of power generation or fracturing applications, communicate with supervisory control and data acquisition ("SCADA") type industrial control systems.

The operative logic of the control system, which is informed by a predetermined algorithm, is capable of producing an output signal with reference to secondary input signals as well, such as, for example, a wear trend or variation trend. By way of example, in one embodiment of the invention transducers are disposed to measure and report particle concentration in the base lubricant, and/or relative permittivity of the nanosuspension. Hypothetically, the relative permittivity of the nanosuspension, or primary input signal, may be a predetermined, critical value, such that the output signal produced would not be operative to affect operation of the engine. However, the primary input signal may also be processed by the control system according to a predetermined algorithm and converted into a secondary input signal. The secondary input signal may then be incorporated into a variation trend. If the variation trend indicates that the relative permittivity of the nanosuspension is decreasing at a rate higher than a predetermined, critical rate, then the output signal may be operative to perform a variety of actions. The output signal may be operative to signal an alarm; schedule maintenance; generate a report and transmit the report via a wireless network; authorize the engine/machine to continue working; reduce power output of the engine/machine; maintain the engine/machine at a predetermined speed or "idle" and the like.

With the foregoing in mind, it can be seen that the operative logic of the present invention is capable of carrying out a detection phase, a diagnostic phase, and a management phase. In one preferred embodiment of the detection phase, capacitance sensors are configured to measure the overall relative permittivity of the base lubricant and/or nanosuspension. Upon determining that the capacitance has decreased relative to a previous state, the system has therefore detected a potential failure initiation and will initiate a diagnostic phase. Within the diagnostic phase, the system combines the input from the capacitance sensors with the physical proximity sensors to determine where the fault may be located. After localizing the failure initiation, the system assesses the failure by establishing trends produced by the failure detected over the input signal's initial reference, determining the variations produced by the use, wear, maintenance, and repairs over initial parameters, calculating the interactions of the related parameters (primary input signals, secondary input signals, first wear trend, and second wear trend), establishing the type of failure and effects, as well as the speed and probability of occurrence of all possible failure scenarios. The system may also establish the severity of the case in light of a predetermined criterion for safety.

At this point the system then initiates the management phase, which includes generating the output signals, alerts, alarms, and reports as described elsewhere herein. If the failure is not determined to be severe, the system may authorize the machine to continue functioning under specific time frames and circumstances. If the failure is severe, the machine may reduce the power delivered in steps, direct the machine to idle, or completely disable the machine. However, in cases where sudden power loss (or other automatic response) may create a safety hazard, the system may provide instructions to a user and/or a user bypass to transfer command to the operator.

Additional embodiments of the present invention include learning capabilities in order to enhance the precision of the reactive component of the present invention with use of the invention. By way of example, one embodiment of the present invention incorporates user input facilities structured and disposed to facilitate user input to the control system.

By way of example, in the scenario of a false-positive whereupon the system has disabled the engine/machine, upon restarting the engine/machine, the system checks all the alarms, settings, and/or adjustments made as a result of the false-positive in order to ascertain the state of the engine/machine at the moment it was disabled as a result of the false-positive. An operator may indicate to the system that the signal reading was a false-positive by, for example resetting the alarm and promptly restarting the engine, thus initiating the routine of ascertaining the state of the engine/machine upon restart. Furthermore, depending upon the type of alarm, the number of times the alarm has occurred in a given period of time, as well as the type of repair anticipated, the system may initiate a change to the algorithm in order to reduce false-positives and/or increase accuracy of alerts and alarms. For example, it may be necessary to alter a probability function of the algorithm in order to reduce its sensitivity. Should such a change be necessary and indeed actually carried out, the system may update itself and "install" the new version of the algorithm such as by writing the updated algorithm to the memory. Additionally, the previous settings and/or the previous version may be stored in the memory as well, or a second memory in order to register/record the changes and to facilitate further diagnosis and services. In addition, the system an operator may utilize a user input facility to override an alarm sounded as a result of a primary input signal measurement. The user input may also be written to the memory and recalled later when an identical or similar primary input signal measurement is received and is operative to prevent the alarm in such recurring circumstances.

The learning capabilities also include the ability to continuously adjust and/or re-write secondary input signals, such as static and dynamic reference points in order to take account of component wear maintenance, repairs, and/or overhauls within the variation trends produced by the algorithm of the control system. Accordingly, a deterioration function may be included in the algorithm based on predetermined factors by such as engine manufacturer.

Lastly, the learning capabilities include the ability to establish a baseline of primary and secondary input signals upon ignition of the engine/machine, by sensing and/or writing available measurements, in order to further facilitate refinement of the probability function of the algorithm In yet further embodiments, the system may also include guidance delivered to an operator of the machine, which may be in text or audible format, such as a computer voice guidance system. The guidance may be generated as an output signal as heretofore described. Such a feature is useful when an operator must continue to control the output of the machine, even when a fault is detected, such as for a loaded mining truck travelling in a caravan. In that event, a sudden power loss would not be safe. Accordingly, the guidance system may deliver instructions to the operator to proceed by delivering steps to follow and the time allotted for each step. By way of example, in a scenario where the machine must be powered down but a sudden loss of power is not recommended or safe, the system may deliver a set of stepped power reductions and time allotments in order to safely power down the machine.

Yet another output signal generated by the system may be an estimate of the anticipated failure time. In such an embodiment, the system utilizes a separate memory to facilitate data storage and tracking in order to continuously calculate and output an anticipated failure time which may be displayed to an operator or incorporated into other output signals, such as voice alerts, voice guidance, alarms, or lights. The system may also recalculate the anticipated failure time as a result of inputs to the machine made by an operator. The anticipated failure time calculation avoids the need to employ specialized staff to monitor the raw data collected by the system, and instead an unskilled operator may utilize the more easily understandable metric of anticipated failure time to inform decisions about operating the machine. The learning capabilities of the system may also receive anticipated failure time calculations to ensure learning even when an operator bypasses any automatic functions.

The principles disclosed herein for hydrodynamic bearings can also be used to detect failures of many lubricated systems. These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be made to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
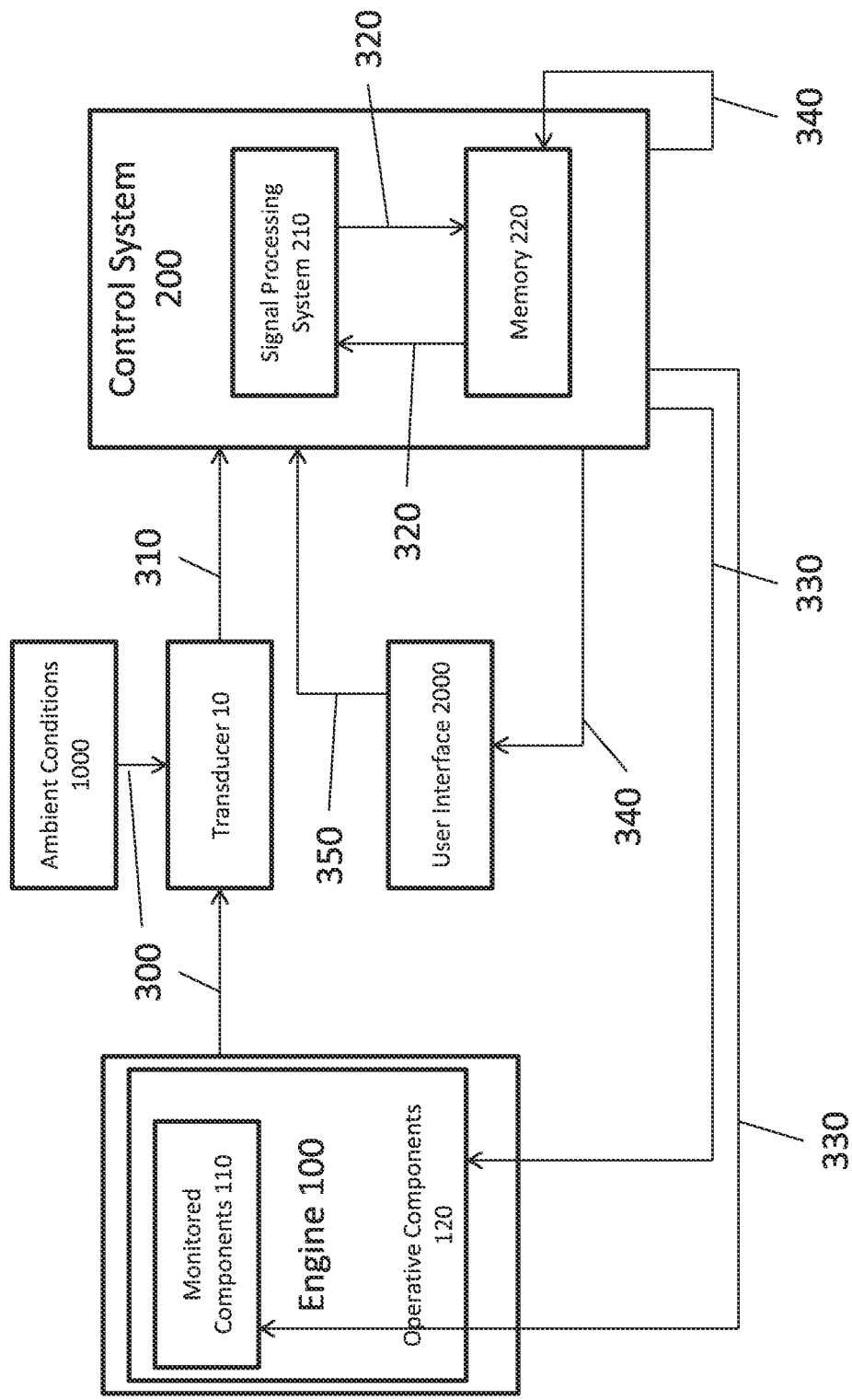
FIG. 1 is a schematic representing the operative features and functions of one embodiment of the present invention.

With reference to FIG. 1, depicted is a schematic representing the operative features and functions of one embodiment of the present invention. As the invention provides a system for predicting, detecting, diagnosing, and responding to faults in combustion ignition engines and/or machines, the schematic begins with an engine 100. As should be apparent, the present invention is not limited to use on engines alone, and as previously stated, the present invention may be applied to/used on machines as described above. In light of this, an engine 100, or any other components as shown in the figures shall be for demonstrational purposes, and not restrict the invention to use solely on engines or depictions per the figures. It will be appreciated that the engine 100 may comprise a wide variety of configurations and operative cycles such as, "V", inline, and horizontally opposed, Otto and Diesel cycles, and the like. Furthermore the engine 100 may be deployed as a mobile power plant, such as those in automobiles, boats, and airplanes, or as static power plants, such as those deployed as generators or hydraulic fracturing applications.

Within and/or coupled to the engine 100 there are a plurality of operative components 120, some of which may be monitored components 110. The operative components 120 within and/or couple to the engine 100 can comprise any of the operative, non-operative, functional, and non-functional parts, elements, constituents, mechanisms, modules, and the like. Operative components 120 may also be referred to as coupled operative components, as they may be operatively coupled to engine 100. In some cases, such operative components 120 may be directly or indirectly coupled to engine 100 and consist of, but not be limited to transmissions, transfer cases, axles, suspensions, hydraulic components, fueling systems, lubrication systems, differentials, starters, braking systems, cooling systems, drive trains, aviation equipment, defense equipment, and/or directional control systems.

The monitored components 110 are a subset of those operative components 120 of which it may be desirable to collect data and/or information relative to one or more physical quantities 300 of the monitored component 110. In one embodiment of the present invention, a monitored component 110 may consist of a component that utilizes a fluid so as to operate.

The physical quantity 300 may be monitored via a transducer 10 (here depicted as a first transducer 10, but may be any of a variety of appropriate transducers), or a plurality of transducers 10. The transducer 10 senses a physical quantity 300 in the form of a physical phenomenon or fundamental unit such as distance, speed, temperature, concentration, capacitance, etc. and then converts the physical quantity 300 into a primary input signal 310 which may be transmitted to a control system 200 which is disposed in communication, wired or wireless, with the transducer 10. Additional transducers 10 may be disposed to sense ambient conditions 1000 of the operating environment, such as temperature, pressure, and/or humidity.

In one embodiment of the present invention, the physical quantity 300 to be monitored may be capacitance of an area and/or relative permittivity of the fluid of the engine 100 and/or its subsequent components 110, 120. In order to monitor such a capacitance, an operating fluid of the engine, may be selected, altered or specified by a user prior to operation of the present invention to be infused with dielectric nanoparticles. In the even that such an operating fluid is an oil to be infused with dielectric nanoparticles, that infusion may be defined as a suspension, to be utilized with the engine 100 and/or its subsequent components 110, 120. Such an altered, selected, and/or specified fluid may comprise dielectric nanoparticles at least an order of magnitude smaller in comparison with the fluid's film thickness and/or a volume fraction lower than the fluid so as to not affect the operating characteristics of the fluid. In one embodiment, the diameter of nanoparticles may comprise a size of 4 to 20 nanometers. Such dielectric nanoparticles may be comprised of, but not be limited to titanium dioxide, graphene, iron(III) oxide and/or ferrites.

The control system 200, in at least one embodiment, comprises at least a signal processing system 210 and a memory 220, with requisite hardware and software facilities, the memory 220 comprising any of a variety of appropriate storage mediums and the signal processing system 210 comprising any of a variety and/or combination of hardware and software facilities. In some embodiments, the control system 200 may comprise an electronic control module, or "ECM," that may be manufacturer installed. Thus, the requisite software facilities may be installed on the ECM. Generally though, the ECM may not be capable of sample rates high enough to facilitate the present invention, and thus a separate control system 200 module may be installed in the engine. The separate control system 200 module may be termed as a High Speed Response Module. It will also be appreciated that the control system 200 may comprise either a single, integrated unit, or a plurality of modules disposed about a vehicle.

The control system 200 is operative to receive a primary input signal 310 and compare the value of the primary input signal 310 to a secondary input signal stored in the memory 220 of the control system as well as other primary input signals 310 received from other transducers 10 (such as a second transducer 20 or merely another first transducer 10 as will be discussed further below). The control system 200 is also operative to process the primary input signal 310 according to predetermined algorithms and generate variation trends incorporating the primary input signal 310 such as wear trends of monitored components 110. By way of example, in at least one embodiment, the signal processing system 210 is able to call up a variation trend, such as a wear trend, from the memory as a secondary input signal 320. The signal processing system 210 is then able to compare the primary input signal 310 to the secondary input signal 320. Then the signal processing system 210 may recalculate the variation trend using the primary input signal 310 and store the recalculated variation trend in the memory 220.

The control system 200 is further configured to produce an output signal, which in some embodiments may be either an action output signal 330 or report output signal 340, but will initiate at least one of a plurality of predetermined control actions. An action output signal 330 may be operative to affect the operation of any of a plurality of operative components 120 of the engine 100, including monitored components 110, in order to adjust the engine's 100 operating characteristics. By way of example, the action output signal 330 may be operative to reduce power produced by the engine, maintain the engine at a predetermined operating speed, such as an idle speed, deactivate the engine, deactivate a component of the engine, such as a fuel injector, etc. Furthermore the action output signal 330 may be operative to interact with a load sharing module, such as those deployed in conjunction with a plurality of engines 100 operating, for example, as generators or in hydraulic fracturing applications. As such, if one engine 100 is operating at a reduced power output, such as when the system reacts to a given primary input signal 310, the operating characteristics of the other engines 100 of the plurality can be modified to, for example, increase power produced individually, in order to maintain overall power produced by the plurality, such as in load sharing applications.

The report output signal 340 may be operative to present a variety of relevant data to, for example, a user of the system by way of a user interface 2000. By way of example, the report output signal 340 may be operative to present an alarm or alert to the user. The report output signal may also be operative to transmit a tailored report including details of a relevant event such as physical quantities 300, primary input signals 310, and secondary input signals 320, including but not limited to variation trends such as wear trends, and the like. The report output signal 340 may also be operative to stream the above-mentioned data and quantities in "real-time" to a user, as physical quantities 300 are measured and variation trends are generated. The user may view the relevant data upon a user interface 2000 which may include a display screen of, for example, a computer or a mobile device. Additionally, the present invention includes wireless transmission facilities configured to transmit the data over wireless networks, such as, cellular networks. The report output signal may also be transmitted to one or more industrial monitoring systems such as a SCADA. As also depicted in FIG. 1, the report output signal 340 may also be written to memory 220 of the present invention to be recalled in the future, as well as incorporated into the secondary input signal 320.

Additional report output signals 340 can comprise an "authorization" to allow the engine to continue working, the scheduling of a repair, or the recalculation of service intervals.

Figure 2:
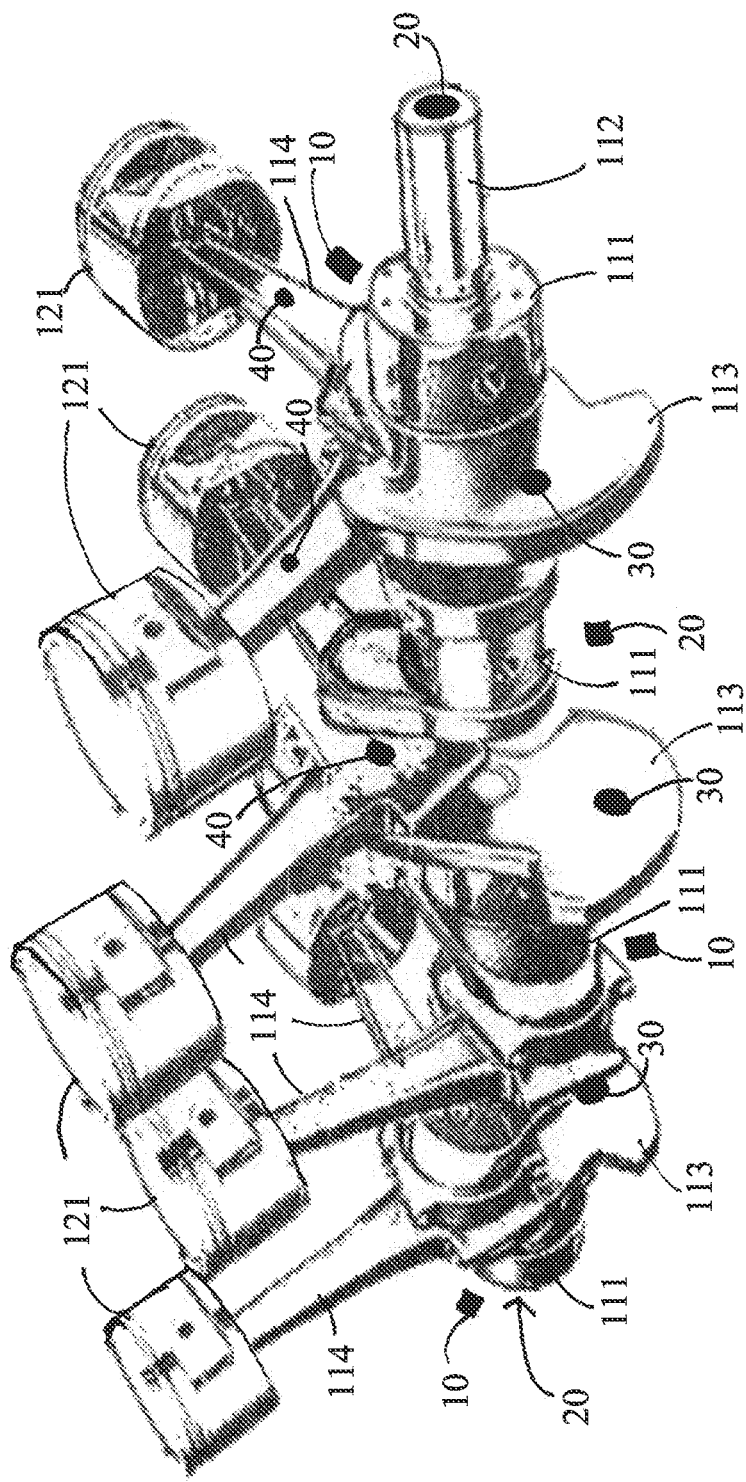
FIG. 2 is a depiction of a portion of an engine representing at least some monitored components in accordance with one embodiment of the present invention.

Now with reference to FIGS. 1 and 2, a plurality of operative components 120 of a portion of an engine 100 are depicted, some of which are monitored components 110. It will be appreciated that FIG. 2 merely presents a portion of operative components 120 of an engine 100 for purposes of clarity. As can also be seen the portion of an engine 100 depicted represents an energy transmitting portion of an 8 cylinder engine of a "V" configuration, though essentially any other configuration may be utilized. As such, depicted is a plurality of pistons 121, which in the depicted embodiment are components 120 that are not monitored, but may be monitored in further embodiments. Additionally depicted are pluralities of connecting rods 114, counterweights 113, bearings 111, all disposed about a crankshaft 112, which in the depicted embodiment are monitored components 110.

As is also depicted, a plurality of first transducers 10 are disposed in proximity to each of a plurality of bearings 111. The first transducer 10 may be disposed upon existing interior and/or exterior portions of an engine 100 such as a crank case, if dry, (not depicted), oil lines (not depicted) or mounted upon special purpose mounting points (also not depicted). Additionally, further embodiments of the first transducer 10 may be mounted directly to the bearing 111. In some embodiments the first transducer 10 may be a proximity detector type transducer, which is capable of detecting variations in length, such as the length from the first transducer 10 to the surface of the bearing. As such, the first transducer 10 could be capable of detecting extrusion or other geometrical failures. In another embodiment, the first transducer 10 may be a capacitive transducer, which is capable of detecting capacitance of an area or relative permittivity of fluids of an area. In such an embodiment, the first transducer 10 could be capable of detecting a change in a relative permittivity of an area or fluids of an area. Additional embodiments of the first transducer 10 may comprise a magnetic pickup or a hall-effect sensor and are capable of detecting geometric variation not by measurement of the distance between the first transducer 10 and surface of the bearing, but by detecting variations of the surface of the bearing relative to the first transducer 10.

A plurality of first transducers 10 facilitates the data collection and calculation of variation trends relative to the wear of the bearings. For example, a first wear trend may comprise data relative to a current quantity of a given bearing 111 as compared an initial quantity of the same bearing 111 which may be stored as secondary input signals in the memory 220 of the system. Furthermore, the signal processing system 210 may process the secondary input signal according to a predetermined algorithm in order to produce a first wear trend indicative of a rate of consumption, or wear, of the bearing 111. Additionally, a second wear trend may comprise data relative to a current quantity of a given bearing 111 as compared to a current quantity of one or more of the other bearings 111 in a plurality (complete set), up to and including all of the other bearings 111 in the plurality (complete set), which may be stored as secondary input signals in the memory 220 of the system. Furthermore, the signal processing system 210 may process the secondary input signal according to a predetermined algorithm in order to produce a second wear trend indicative of the variation of rates of wear across two or more bearings 111 of a plurality. As previously mentioned, wear trends, either first or second, or variation trends may take multiple different embodiments.

A second transducer 20 is depicted as being disposed at each end of the crankshaft 20 and is deployed in order to detect variations in the eccentricity at with the crankshaft rotates. As such a suitable second transducer 20 may comprise an accelerometer in order to detect changes in the vibrations induced when off-axis rotation or other eccentricity is present in the rotation of the crankshaft, which may be symptomatic of a bearing failure. In another embodiment, a second transducer 20 may comprise a capacitive transducer. As such it will be appreciated that a maximum physical quantity, in this case a maximum amount of eccentricity, may be defined and the present invention may be operative to generate a predetermined output signal 330,340 in response to a primary input signal 310 indicative of a physical quantity 300 of a monitored component 110 exceeding the maximum physical quantity.

Additionally, a plurality of third transducers 30 may be disposed on each of the counterweights 113 and a plurality of fourth transducers 40 are disposed on the connecting rods 114. In some applications, such as a "V" configuration, only one fourth transducer 40 per connecting rod 114 couple may be necessary. In other configurations, such as inline configurations, one fourth transducer 40 per connecting rod 114 may be sufficient. Similar to above, excess vibration, or localized temperature increase in either the connecting rods 114 or counterweights may be symptomatic of bearing failure. As such suitable third transducers 30 and fourth transducers 40 may comprise accelerometers, thermocouples, or thermistors.

Additional, un-depicted, transducers may comprise those structured, configured, and disposed to measure and/or detect the following physical quantity which is merely illustrative: the mechanism of flaking; the presence of metals, magnetic or not; oil life including soot concentration, capacitance of a fluid, capacitance of an area, fuel dilution, viscosity, pressure, temperature, concentration of particulate matter, and time elapsed since change of oil; fuel condition including temperature, catalytic fines content of fuel, and water content of fuel; engine performance including throttle position, engine speed (RPM), exhaust temperature, the occurrence of blow by, boost pressure produced by the turbocharger, and crankshaft vibration signature variation; ambient conditions including temperature, pressure, humidity, and altitude; and application control module interaction including load sharing modules and fracturing engine control modules. It will be appreciated that the additional transducers may comprise those that are included as OEM parts and thus, the primary input signal 310 produced by the OEM transducer will be sufficient for purposes of the present invention. It will be further appreciated that each of the physical quantities illustrated above may have a corresponding maximum physical quantity value, such as a maximum concentration of soot in oil, which may be predetermined and stored in the memory 220 as secondary input signal. The present invention may then be configured to produce an output signal 330,340 in response to a primary input signal 310 indicative of exceeding the maximum physical quantity value.

Figure 3:
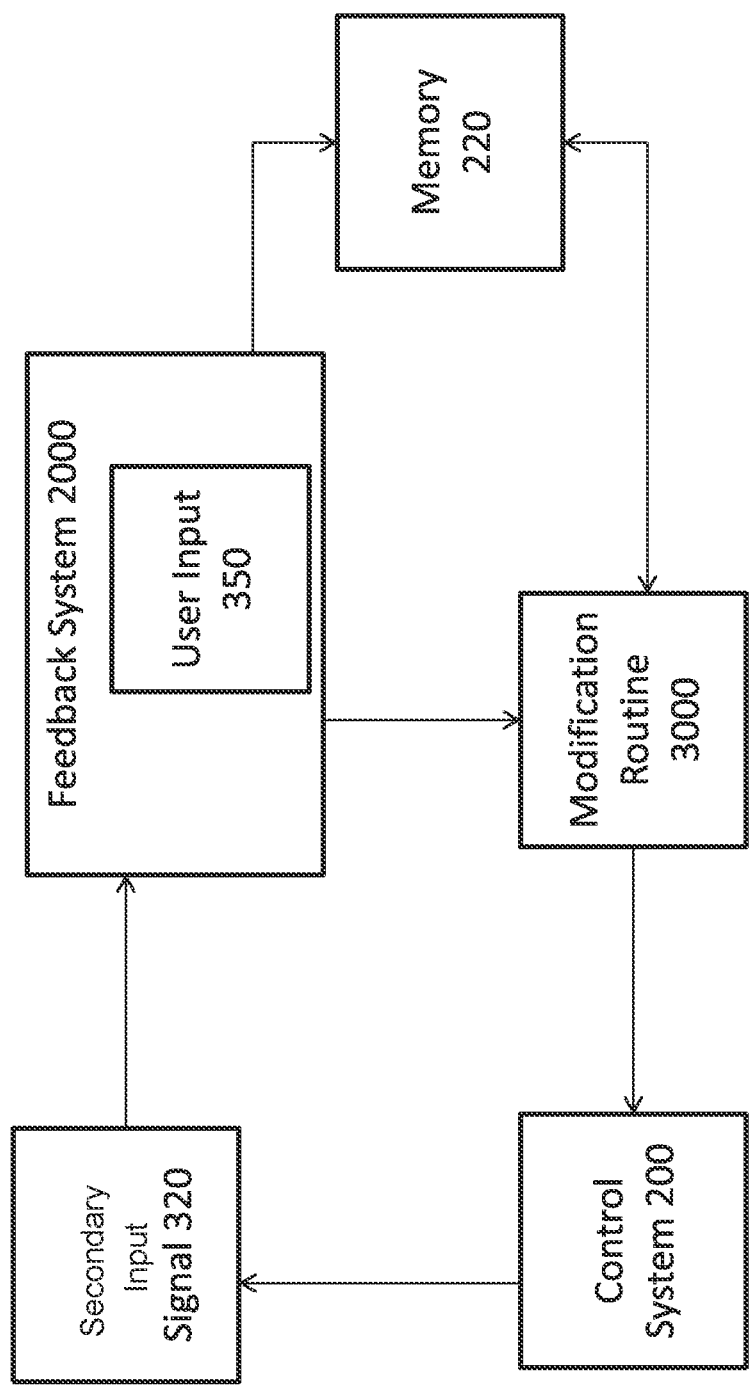
FIG. 3 is a schematic representing additional features and functions of one embodiment of the present invention.

With reference to FIG. 3, the present invention includes learning capabilities operative to modify the algorithms and/or operative logic upon which the system generates variation trends and output signals. FIG. 3 is a schematic diagram depicting the operative logic controlling the learning capabilities of one embodiment of the present invention. Secondary input signals 320 are incorporated into a feedback system 2000 of the present invention. In at least one embodiment, the feedback system 2000 operates autonomously to continuously compare the secondary input signal 320 with the static reference points, such as an initial physical quantity value stored in a memory 220 of the system, or dynamic reference points, such as variation trends such as the wear trends described above, and to continuously adjust the reference points via a modification routine 3000.

The process by which feedback system 2000 and modification routine 3000 operate may also occur each time the engine is started. For example, before ignition of the engine, but while the system is powered, the system, or in certain embodiments, the feedback system 2000, may ascertain the state of the engine at the moment it was last deactivated. This may include any alarms or alerts, failure codes, secondary input signals, primary input signals, and/or the existence of any repairs or maintenance (such as, for example, the detection of fresh oil). Moreover, depending upon the type of alarm, the number of times it occurred in a given period of time, and/or the type of repair or maintenance indicated the system, may indicate a change to the algorithm is necessary or desirable and run simulations and/or prediction functions of the algorithm. Then the system may initiate the modification routine 3000, in which the algorithm, or a probability function or simulation function thereof, is modified and written to a memory 220 of the system. In further embodiments the system also writes the previous algorithm to a second memory (not depicted), which is segregated, either physically or virtually/electrically (as in a partition) from the memory 220. Lastly, the system indicates and/or authorizes ignition of the engine 1000 and the system then begins to utilize the modified algorithm.

Additionally, the reference points may be manually reset via user input 350 (as depicted in FIG. 1) by re-writing the references points in the memory 220 of the system. Furthermore, the present invention may be programmed to "ignore" certain conditions as false-positives, generally by reference to user input 350 indicating a certain condition is a false-positive, storing the condition in memory, and then comparison to future secondary input signals 320 to determine if the false-positive condition is met.

Figure 4:
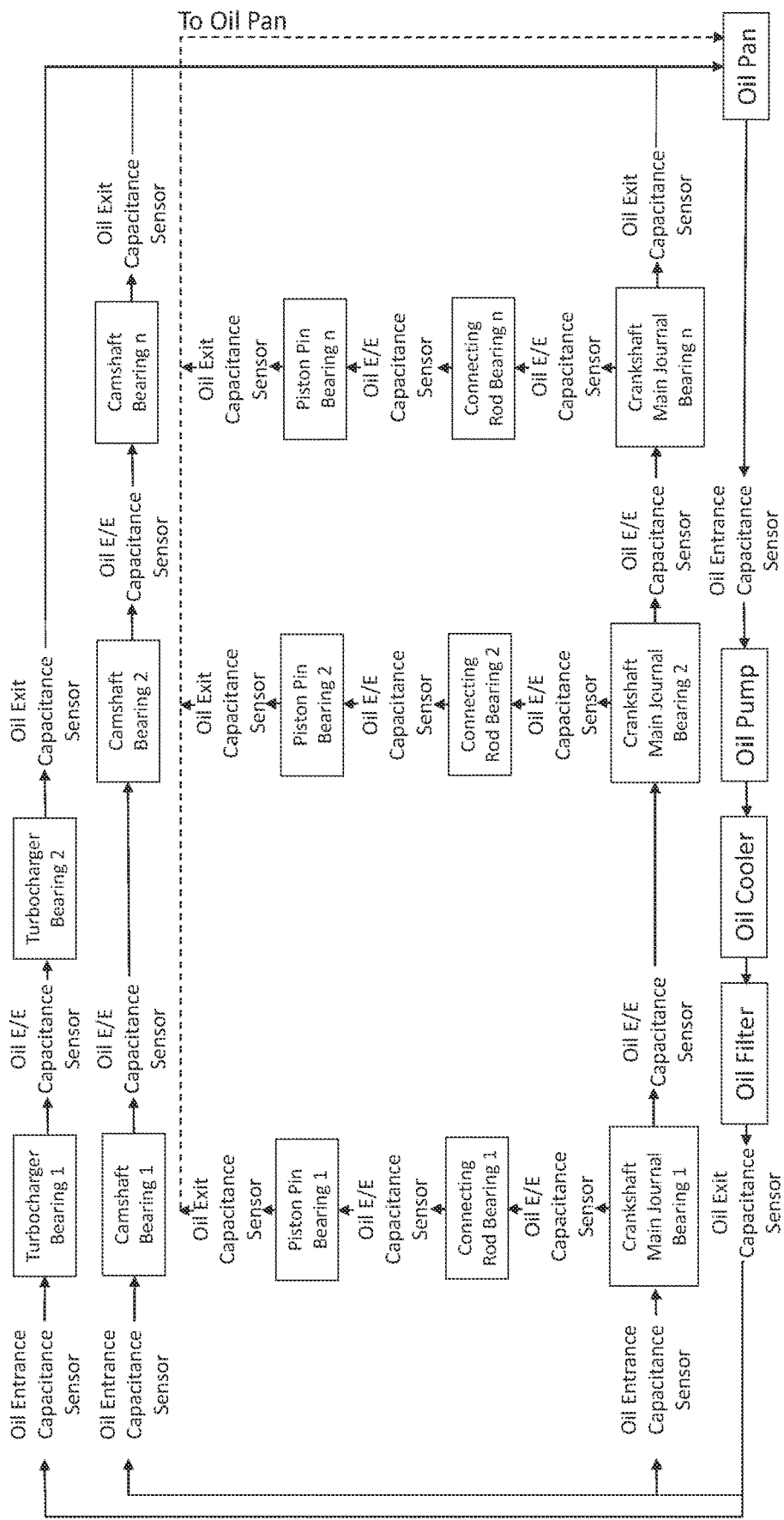
FIG. 4 is a schematic depiction of the placement of various transducers relative to operative components within an engine according to one embodiment of the present invention.

FIG. 4 is a schematic representation of capacitance sensors placed within the oil transport channels of an engine. In such an embodiment, the oil consists of a nanosuspension of nanoparticles suspended in the base lubricant, as described above, such that the dielectric constant of the nanosuspension can be measured. Specifically, it can be seen that capacitance sensors are placed to measure the dielectric constant of the oil at both the entrance and exit points of the oil lines at monitored components within an engine, in this case, each of the bearing sets of the engine as well as the oil pump/filter/cooler assembly. As such, in accordance with the embodiments described above, any decrease in dielectric constant of the oil as measured across the entrance and exit sensors of a given component, or a decrease that is inconsistent with other similar components, can assist in localizing an initiating or impeding failure to a particular component. Accordingly, the capacitance sensors are disposed to detect the specific bearing where a failure occurs. For example, when deployed in an engine, these sensors permit a user to determine whether the failure occurs at one particular main journal bearing, camshaft bearing, piston pin bearing or any other internal component. Additionally, capacitance sensors located on an external component such as a turbocharger can detect similar bearing failures. Moreover, capacitance sensors may also be installed on the engine-driven equipment to detect their respective bearing failures.

Figure 5:
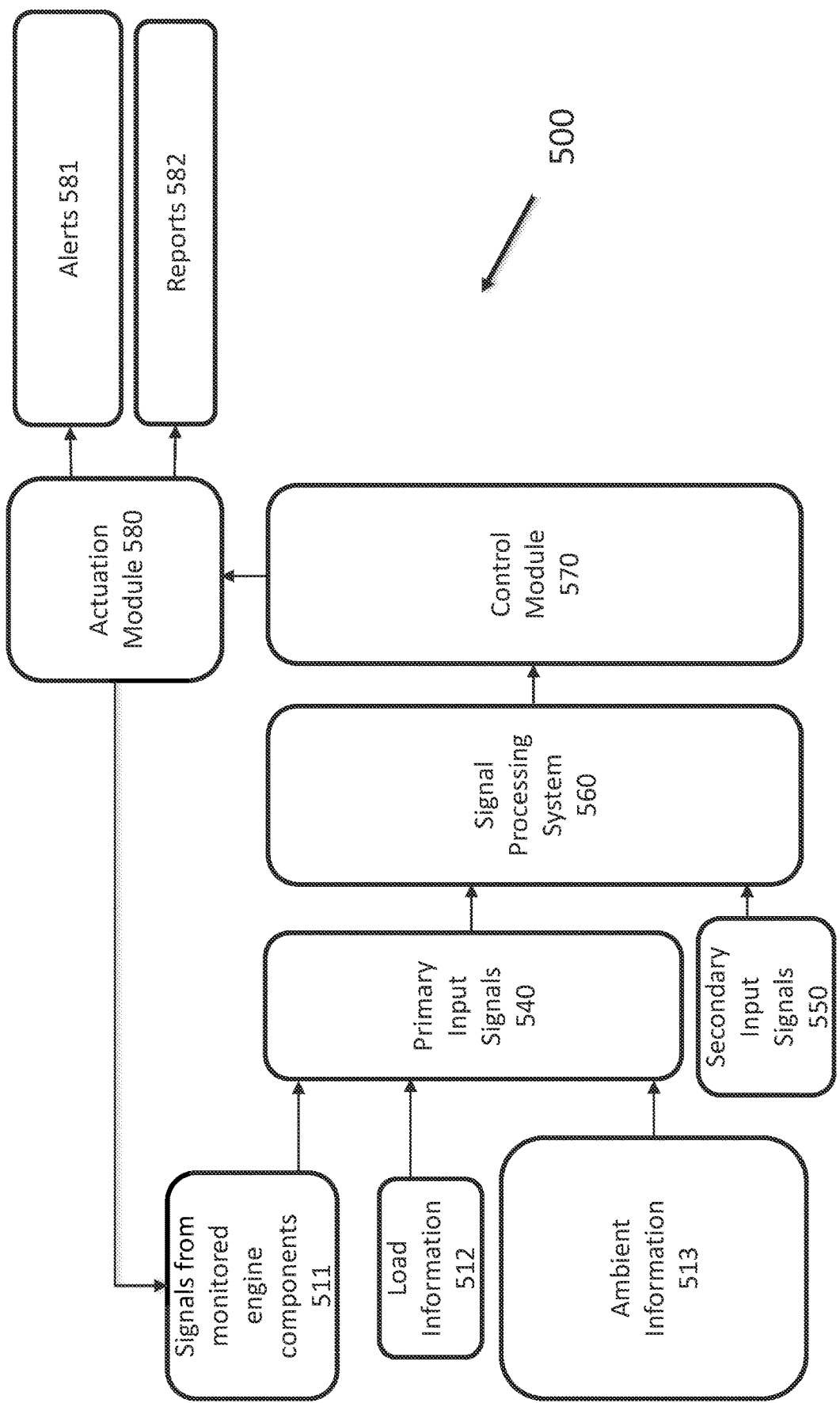
FIG. 5 is a schematic depiction representing the flow of information through various components of one embodiment of the present invention.

FIG. 5 is a schematic depiction of the system 500 of the present invention according to at least one embodiment. In such an embodiment, the system takes as primary input signals 540 the information that comes from the monitored engine component signals 511, information about the load conditions for the machine 512, as well as ambient information 513. The signals from the monitored engine components 511 are taken from various transducers disposed about the machine, and in a preferred embodiment include at least a plurality of capacitance sensors and a plurality of proximity sensors. The capacitance sensors can be disposed to measure the dielectric constant of the oil at various points as it its transported about the engine while the proximity sensors may be utilized to monitor geometric variations in a plurality of monitored components. The load information 512 pertains to the requirements of the machine being demanded by the operator and working conditions, such as a particular output under particular circumstances. With respect to an engine, this is typically referred to as engine load, and data pertaining to the load information 512 may be accessible from the OEM engine components, which typically measure engine load with respect to primary signals as throttle position and manifold absolute pressure (turbo boost), and a secondary input signal, which is the ratio between the current fuel consumption against the manufacturer-specified fuel consumption rate the engine or turbine would have at the same operating condition. The ambient information 513 is collected by ambient condition sensors, such as those for temperature, pressure, and humidity. Primary input signals 540 may also consist of other physical quantities measured which pertain to the machine, such as pressure, temperature, and viscosity of oil, coolants, and air, RPMs, throttle position, linear vibration analysis, etc.

The secondary input signals 550 are generally drawn from data stored in a memory of the system, and typically pertain to historical conditions of the engine and its components. Such secondary input signals 550 may include the oil specification and components, quantity of oil consumed between oil analyses, oil change interval, power delivery profile, duty cycle, machine failure history, metrics about the machine itself (manufacturer, type, application, settings), and history of ambient conditions.

The signal processing system 560 may include one or more computing devices configured to receive primary input signals 540 and secondary input signals 550 and assess the presence or initiation of a failure, the speed of growth of any failure, predict the likelihood of failure and likely failure mode, and calculate the anticipated time to failure. Upon determining that a failure has been initiated, the signal processing system 560 may also calculate the "seriousness" of a failure with respect to a predetermined standard, one which the algorithm calculates by establishing the most probable consequence and affects that the detected failure could cause, including their likelihood of occurrence.

Output from the signal processing system 560, such as whether or not a failure exists, the speed of growth of the failure, the seriousness of the failure, and the anticipated failure time, is sent to the control module 570. Upon predetermined criteria, the output control module 570 determines actions for the system to take, such as presentation of an alert, transmittal of a report, and actions to modify the operation of the machine, such as by reducing power output, deactivating a cylinder, or shutting the machine down. The result of this determination is sent to the actuation module 580 which accomplishes these tasks.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system adapted to determine conditions in mechanical components due to wear conditions comprising:
   a machine including a plurality of operative components;
   a suspension of nanoparticles within a base lubricant of said operative components;
   nanoparticles of said suspension of nanoparticles which congregate within voids in surfaces of said operative components at least altering a relative permittivity of said at least one suspension of nanoparticles; and
   at least one transducer disposed in relation to said machine configured to measure at least said relative permittivity of said suspension of nanoparticles.

2. The system as recited in claim 1 wherein said nanoparticles are between 4 and 20 nanometers.

3. The system as recited in claim 1 wherein said nanoparticles are comprised of a material selected from at least one of the following: titanium dioxide, graphene, iron (III) oxide, and ferrites.

4. The system as recited in claim 1 further comprising a control system disposed in communication with at least said at least one transducer and comprising at least one memory and a signal processing system.

5. The system as recited in claim 4 further comprising said control system further disposed in operative, controlling relation to said plurality of operative components and said machine.

6. The system as recited in claim 4 wherein said control system is configured to at least process a primary input signal from said at least one transducer wherein said primary input signal comprises a measurement of at least a relative permittivity of said suspension of nanoparticles and to at least generate a first wear trend.

7. The system as recited in claim 6 wherein said first wear trend is determined at least by said primary input signal and a secondary input signal which comprises at least an initial, known relative permittivity of said suspension of nanoparticles.

8. The system as recited in claim 6 wherein said first wear trend indicates a rate of said nanoparticles of said suspension of nanoparticles congregating within voids in surfaces of said operative components by comparing said primary input signal to said secondary input signal.

9. The system as recited in claim 6 wherein said control system is structured to generate an output signal determined at least by said first wear trend and operative to initiate at least one of a plurality of predetermined control actions.

10. The system as recited in claim 9 wherein one of said plurality of predetermined control actions comprises at least an alarm operative to indicate a condition of said machine.

11. The system as recited in claim 9 wherein one of said plurality of predetermined control actions comprises modifying an operating characteristic of said machine.

12. The system as recited in claim 9 wherein one of said plurality of predetermined control actions comprises maintaining said machine at a predetermined period of operation.

13. The system as recited in claim 9 wherein one of said plurality of predetermined control actions comprises permitting said machine to work.

14. The system as recited in claim 9 wherein one of said plurality of predetermined control actions comprises modifying a maintenance interval of said machine.

15. The system as recited in claim 9 wherein one of said plurality of predetermined control actions comprises a termination of operation of said machine.

16. The system as recited in claim 9 wherein one of said plurality of predetermined control actions comprises transmittal of a report comprising at least a variation trend.

17. A system adapted to determine conditions in mechanical components due to wear conditions comprising:
an engine including a plurality of operative components;
said plurality of operative components comprising at least one lubricated system with at least one fluid operatively disposed in relation to said engine;
a first transducer disposed in relation to said at least one lubricated system configured to measure a quantifiable value of said at least one lubricated system;
at least one secondary fluid operatively disposed in relation to said plurality of coupled operative components;
said at least one secondary fluid comprising at least dielectric nanoparticles;
said dielectric nanoparticles consisting essentially of diamagnetic materials;
said dielectric nanoparticles of said at least one secondary fluid which congregate within voids in surfaces of said operative components at least altering a relative permittivity of said at least one secondary fluid; and
at least one second transducer disposed in relation to said plurality of coupled operative components configured to measure at least said relative permittivity of said at least one secondary fluid.

18. The system as recited in claim 17 wherein said at least one second transducer is at least a capacitive transducer.

19. The system as recited in claim 17 further comprising a control system disposed in communication with said at least one second transducer comprising at least one memory and a signal processing system.

20. The system as recited in claim 19 further comprising said control system further disposed in operative, controlling relation to said plurality of operative components and said engine.

21. The system as recited in claim 19 wherein said control system is configured to at least generate an output signal determined at least partially by both a first wear trend and a second wear trend.

22. The system as recited in claim 21 wherein said control system is configured to at least process a primary input signal from said first transducer wherein said primary input signal is a quantifiable measurement of said at least one lubricated system.

23. The system as recited in claim 22 wherein said control system is configured to at least calculate a first wear trend based at least on a said primary input signal from said first transducer and a secondary input signal related to said at least one lubricated system.

24. The system as recited in claim 21 wherein said control system is configured to at least process a primary input signal from said at least one second transducer which comprises a measurement of at least a relative permittivity of said secondary fluid.

25. The system as recited in claim 24 wherein said control system is configured to at least calculate a second wear trend based at least one said primary input signal from said at least one second transducer and a secondary input signal which comprises at least an initial known relative permittivity of said secondary fluid.

26. The system as recited in the claim 25 wherein said second wear trend indicates a rate of said dielectric nanoparticles of said secondary fluid congregating within voids in surfaces of said operative components by comparing said primarily input signal from said at least one second transducer and said secondary input signal which comprises at least an initial known relative permittivity of said secondary fluid.

27. The system as recited in claim 21 wherein said output signal operative to initiate at least one of a plurality of predetermined control actions.

* * * * *